Patented Sept. 28, 1937

2,094,564

UNITED STATES PATENT OFFICE 2,094,564

ANTIFREEZING LIQUID

Otto Schenck, Dessau, and Walter Gellendien, Berlin-Charlottenburg, Germany, assignors to Deutsche Hydrierwerke Aktiengesellschaft, Berlin-Charlottenburg, Germany, a corporation of Germany No Drawing. Application December 24, 1935, Serial No. 56,076. In Germany November 13, 1934

2 Claims. (Cl. 252—5)

There has been proposed a great number of substances to be used as means to avoid freezing of the confining liquids in gas meters, cooling liquids in motor-coolers of automobiles and so on either alone or in most cases as an addition to water respectively to aqueous liquids. Many of these like hydrocarbons or tar oils must be excluded on account of their little conductivity of heat or their inflammability or because they attack caoutchouc. Others again like salts are apt to corrode metallic parts. Very satisfactory proved to be glycerol and ethylene glycol. These substances however also in aqueous solutions, particularly at low temperatures are rather viscose which is a drawback in practical working.

Now it has been found, that the hydrogenation products of furfurol, i. e. furfuryl alcohol and in particular tetrahydrofurfuryl alcohol are very good antifreezing means alone or in mixture with the splitting off products which are produced simultaneously in small amount by energetic hydrogenation, as pentandiol and amyl alcohol. Furfuryl alcohol and tetrahydrofurfuryl alcohol are miscible with water in any ratio and lower essentially the freezing point of it already after addition of small quantities.

A mixture of three parts of water and one part of tetrahydrofurfuryl alcohol allows of cooling down to —8° C. before crystallization ensues. A mixture of two parts of water and one part of tetrahydrofurfuryl alcohol crystallizes not before —15° C. By mixing the aqueous solutions of the above named hydrogenation products with liquid organic compounds such as methanol, ethanol, butanol, amyl alcohol, ethylene glycol, propylene glycol, butylene glycol, glycerol, the mono-alkyl-ethers of glycol and glycerol, the freezing point of the liquids may still further be lowered.

As compared with other antifreezing means of an alcoholic nature the hydrogenation products of furfurol are regarding corrosion by no means inferior and may be rendered easily fast to corroding by addition of known means such as the soluble salts of benzoic, salicylic or oleic acid in an amount of less than one percent. Being of a minor viscosity they are most fit for gas meters.

Example 1

An excellent antifreezing liquid for motor-coolers of automobiles is obtained by mixture of one part by volume of tetrahydrofurfuryl alcohol and one part by volume of water. This mixture allows of cooling down to —20° C. before crystallization occurs.

Example 2

By mixing of one part of tetrahydrofurfuryl alcohol, half a part of ethylene glycol and two parts of water one obtains an antifreezing liquid which may be used as confining liquids for gas meters.

We claim:

1. The method of preventing freezing and corrosion in the aqueous systems of gas meters and internal combustion engines which comprises using as the liquid thereof a solution of furfuryl alcohol and water.

2. The method of preventing freezing and corrosion in the aqueous systems of gas meters and internal combustion engines which comprises using as the liquid thereof a solution of furfuryl alcohol and water in about equal proportions.

OTTO SCHENCK.
WALTER GELLENDIEN.